UNITED STATES PATENT OFFICE.

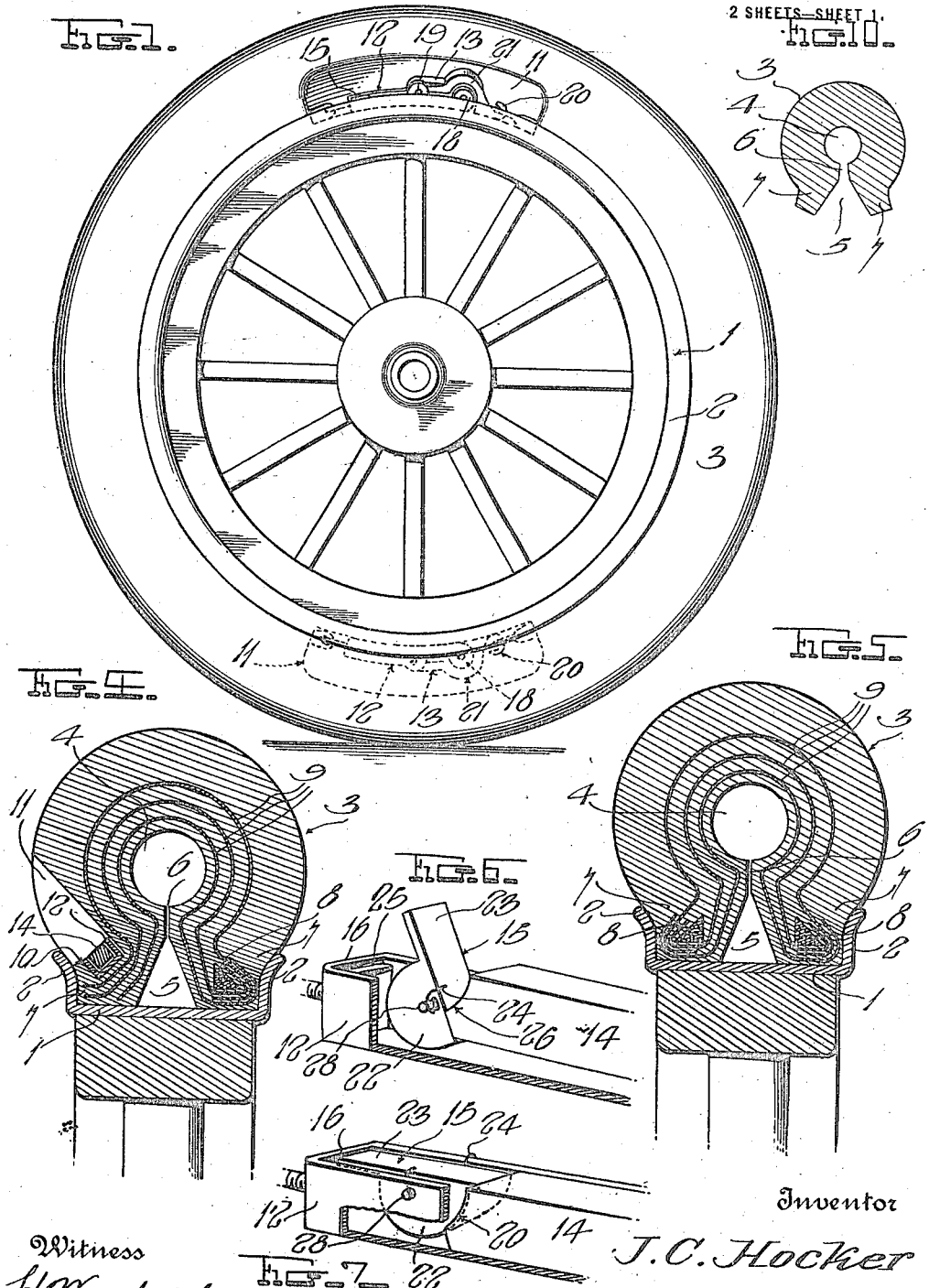

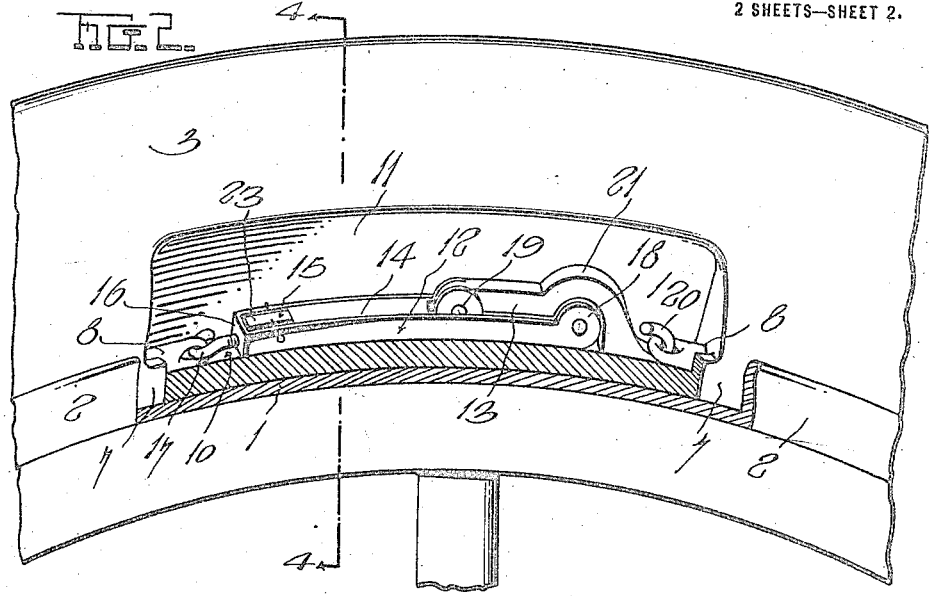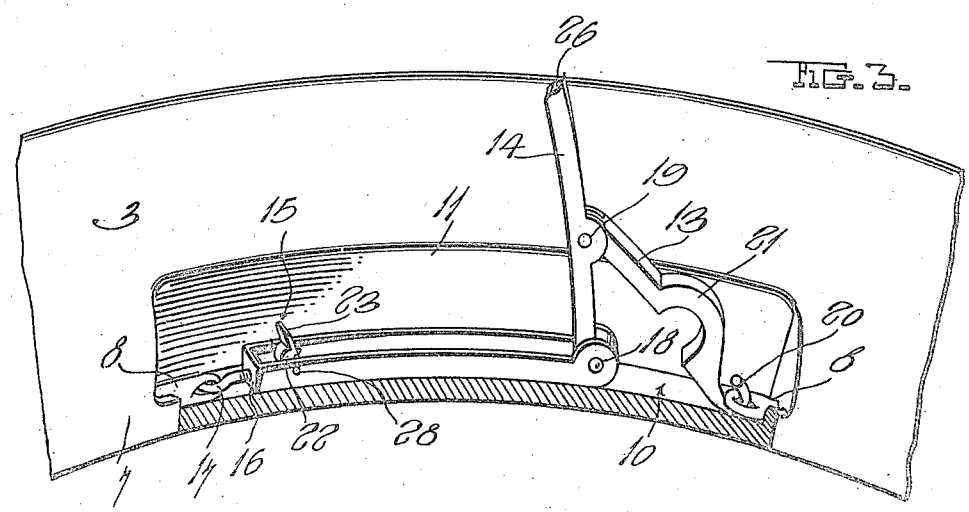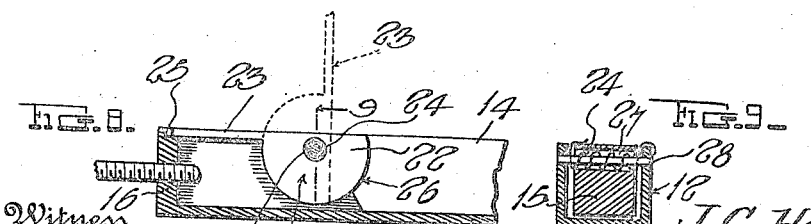

JEFFERSON C. HOCKER, OF BARNARD, MISSOURI.

FASTENER FOR VEHICLE-TIRES.

1,248,326.   Specification of Letters Patent.   Patented Nov. 27, 1917.

Application filed March 1, 1917. Serial No. 151,823.

*To all whom it may concern:*

Be it known that I, JEFFERSON C. HOCKER, a citizen of the United States, residing at Barnard, in the county of Nodaway and State of Missouri, have invented certain new and useful Improvements in Fasteners for Vehicle-Tires; and I do declare the following to be a full, clear, and exact description of the invention, such as will enable others skilled in the art to which it appertains to make and use the same.

My invention has for its object to provide a simply constructed yet an efficient fastening device for securing vehicle tires detachably on the wheel rims.

With the foregoing general object in view, the invention resides in the novel features of construction and unique arrangements of parts to be hereinafter fully described and claimed, the descriptive matter being supplemented by the accompanying drawings which constitute a part of this application and in which:

Figure 1 is a side elevation of an automobile wheel equipped with one of the improved tires;

Fig. 2 is an enlarged elevation showing more particularly the means for contracting the tire bead around the rim and for releasing said bead when the tire is to be removed;

Fig. 3 is a view similar to Fig. 2, showing said releasing and contracting means in position to permit attachment or detachment of the tire;

Fig. 4 is an enlarged transverse section on the plane of the line 4—4 of Fig. 2, illustrating primarily the arrangement of the bead contracting and releasing means;

Fig. 5 is an additional transverse section illustrating primarily the arrangement of the canvas reinforcing plies in the tire;

Fig. 6 is an enlarged perspective showing the operating lever of the bead controlling means moved approximately to locked position;

Fig. 7 is a similar view showing said lever locked in position to retain the tire on the rim;

Fig. 8 is a detail longitudinal section of the parts illustrated in Figs. 6 and 7;

Fig. 9 is a detail transverse section on the plane of the line 9—9 of Fig. 8, illustrating the preferred type of spring for holding the lever locked in operative position; and Fig. 10 is a diagrammatic transverse section of the tire showing its approximate formation when removed from the rim.

In the drawings above briefly described, the numeral 1 designates a straight side automobile wheel rim having the usual side flanges 2 while 3 designates the improved tire which is applicable to other types of rims than that shown, for instance, the common form of clencher rim and the quick detachable.

The tire 3 is substantially solid, being for the most part formed of rubber or other suitable composition but a continuous air space 4 is provided at the center thereof as shown in the transverse sections, the inner or rim engaging portion of the tire being formed with a circumferential air channel 5 midway its side edges, said channel and space being connected by the circumferential slit 6 which thus divides the inner portion of the tire into a pair of beads 7, each of which is reinforced by a suitable wire cable 8 preferably of the common construction although the inclined side of said cable is located toward the exterior of the tire.

Embedded in the rubber or the like of which the body of the tire is formed, are a number of plies 9 of canvas or other material appropriate for reinforcing purposes, the edges of said plies being passed in opposite directions around the cables 8 as illustrated clearly in Fig. 5 and at the right of Fig. 4. At the left of the last named figure, is illustrated the arrangement of the plies in the portions of the beads 7 between the ends of the cables 8, said portions having circumferential grooves or seats 10 opening into cut out portions 11 at the sides of the tire, said seats and cut out portions receiving the means for connecting the ends of said cables.

Since the means last referred to is duplicated on opposite sides of the tire, the arrangement on one side thereof only is illustrated in detail. Said means comprises briefly a body 12 connected to one end of the cable 8, a link 13 connected to the other end thereof, a lever 14 connecting said body and link and a lock 15 for securing said lever in operative position.

The body 12 is of elongated channel-shaped formation having one end closed at 16 and provided with an eye 17 threaded therein for attaching it adjustably to the cable, whereas the other end of said body is formed with ears 18 on its side flanges between which the inner end of the lever 14 is fulcrumed, said lever being of a size to fold into the channel of the body 12 as shown clearly in Fig. 2, in which position it is retained by the lock 15. The link 13 is formed of a single piece of metal pivoted at 19 to the lever 14 between the ends of the latter, the outer end of said link having a hook or eye 20 by means of which it is connected to the end of the cable 8 opposite that engaged with the eye 17. Between its ends, link 13 is arched at 21 to accommodate the fulcrum of the lever 14 when the device is locked, the pivot 19 being then below dead center to cause a downward pull to be exerted on the lever 14. This pull tends to retain said lever in the channel of the body 12 and thus relieves unnecessary strain from the lock 15.

The lock above referred to consists of a substantially semi-circular block 22 pivotally mounted in the body 12 and an operating arm 23 extending from the periphery thereof, said block being impelled in one direction by a suitable spring 24 and said arm 23 serving to limit the movement of said block by contact with the closed end 16 of body 12, said end preferably having a seat 25 to receive the free end of said arm as illustrated most clearly in Fig. 8. A screwdriver or the like may be inserted into the seat 25 for moving the lock 15 to the dotted line position of Fig. 8 and when in this position the lever 14 is free to swing outwardly as illustrated in Fig. 3. When, however, said lever is in closed position, the peripheral portion of the block 22 opposite the arm 23, is received in a curved seat 26 in the free end of said lever and thus the latter is held against movement.

The spring 24, as above suggested, may be of any suitable type, but as illustrated most clearly in Figs. 8 and 9 it is by preference in the form of a coil, bearing at one end on the lock 15 and at its other on the body 12, said spring passing through the axial bore 27 of the block 22 and surrounding the pivot pin 28 of said block which likewise passes through said bore and through the side flanges of the body 12.

A tire embodying the features above described may be easily attached and detached by operating the lever 14 and thus a great deal of trouble and annoyance is averted. Since these advantages are best derived from the construction shown and described, this construction constitutes the preferred form of the device, but it is to be understood that within the scope of the invention as claimed, numerous changes may be made without sacrificing the principal advantages.

I claim:

1. A connecting device comprising an elongated channel-shaped body, a lever fulcrumed at one end between the side flanges of said body and adapted to fold into the channel thereof, a link pivoted to said lever between its ends and arched to extend over the fulcrum thereof, and a lock in said body for holding said lever in said channel.

2. A connecting device comprising an elongated channel-shaped body, a lever fulcrumed at one end between the side flanges of said body and adapted to fold into the channel thereof, a link pivoted to said lever between its ends, a substantially semi-circular block pivotally mounted in one end of the aforesaid channel and having a combined stop and operating arm extending outwardly from its periphery, a fixed stop coöperating with said arm, and a spring for turning said block to the extent permitted by said arm and stop, the free end of the aforesaid lever having a seat to receive a portion of said block when said lever is folded into the channel of the aforesaid body.

In testimony whereof I have hereunto set my hand in the presence of two subscribing witnesses.

JEFFERSON C. HOCKER.

Witnesses:
  G. H. HARGRAVE,
  C. E. GOFF.

Copies of this patent may be obtained for five cents each, by addressing the "Commissioner of Patents, Washington, D. C."